Patented Sept. 3, 1929.

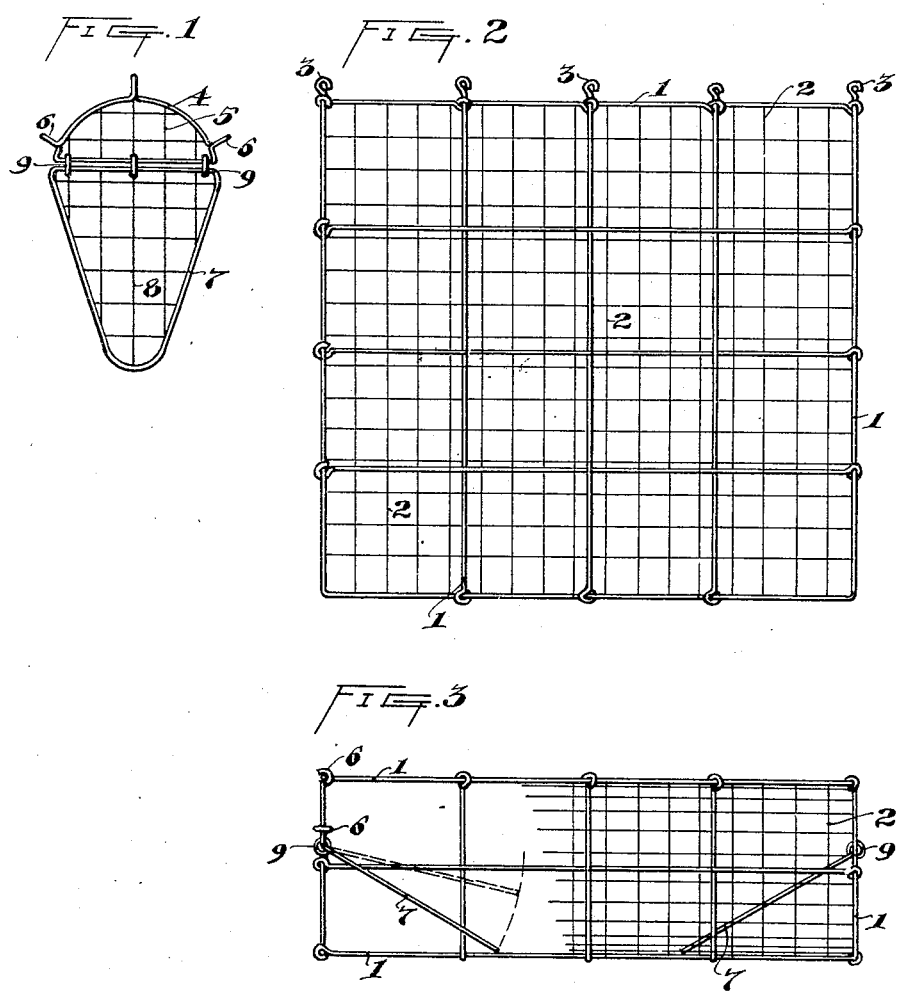

1,726,909

UNITED STATES PATENT OFFICE.

HENRY CHRISTIAN LOFTSGAARDEN, OF KEOMA, ALBERTA, CANADA.

ANIMAL TRAP.

Application filed February 29, 1928. Serial No. 257,987.

My invention relates to traps for animals and particularly to traps for small fur bearing animals, and the objects of my invention are, first, to provide a trap which is light and takes a minimum of space in transport; second, to provide a trap which does not injure the pelt of the animal taken and which is also humane in method; third, to provide a trap which after the animal is taken protects same from other beasts or birds of prey. I attain these and other objects in view by the mechanism illustrated in the accompanying drawings; in which—

Fig. 1 is an elevation of one of the ends for the trap.

Fig. 2 is an elevation of the body of the trap rolled out flat.

Fig. 3 is a side view of the trap assembled, part of the wire meshing being omitted to show the interior.

Similar numerals refer to similar parts throughout the several views.

The body of the trap consists of a wire framework 1, of spring wire the interspaces of same being filled in with a lighter wire meshing 2 the size of mesh in same being determined by the size of the animal to be caught. Along one side of the framework 1 are formed the hooks 3 which are conveniently made on the ends of some of the wires of the frame 1. The end panels of the trap comprise a fixed portion with a wire frame 4, filled with meshing 5, and having the hooks 6 formed on the frame 4.

Hingedly attached to the end panels by the rings 9, are the dropper panels, comprising a wire frame 7 filled with meshing 8.

To assemble the trap the body which is normally flat for transport, is rolled into a cylindrical form the hooks 3 being engaged with the opposing edge. The end panels are introduced and retained in position by the hooks 6 engaging the edge wire of the trap body. The dropper pieces project inwardly.

The trap in use is placed in the runway of the animal to be taken, and arranged that the dropper pieces close by gravity. They present very little resistance to the entrance of the animal into the trap, and on closing prevent the animal from escaping. While I prefer to make such traps of wire for lightness I also contemplate making same of thin sheet metal which may be perforated or solid, the principle of collapsibility however being retained irrespective of the material used.

What I claim is:

An animal trap comprising a body consisting of a rectangular framework of spring wire with hooks along one edge, light wire meshing filling the interspaces of the said framework the whole being adapted to form a cylindrical cage, end closures to the cylindrical cage comprising stationary pieces detachably secured and dropper pieces hingedly attached to the stationary pieces.

HENRY CHRISTIAN LOFTSGAARDEN.